(12) United States Patent
Wrage et al.

(10) Patent No.: US 7,504,741 B2
(45) Date of Patent: Mar. 17, 2009

(54) WIND ENERGY PLANT WITH A STEERABLE KITE

(75) Inventors: Stephan Wrage, Hamburg (DE); Stephan Brabeck, Hamburg (DE)

(73) Assignee: Skysails GmbH & Co. KG, Hamburg (DE)

( * ) Notice: Subject to any disclaimer, the term of this patent is extended or adjusted under 35 U.S.C. 154(b) by 220 days.

(21) Appl. No.: 11/694,715

(22) Filed: Mar. 30, 2007

(65) Prior Publication Data

US 2007/0228738 A1    Oct. 4, 2007

(30) Foreign Application Priority Data

Mar. 31, 2006  (DE) .................. 20 2006 005 389 U (51) Int. Cl.
*F03D 9/00* (2006.01)

(52) U.S. Cl. .......................................... 290/55; 290/44

(58) Field of Classification Search .................. 290/43, 290/44, 54, 55; 415/3.1
See application file for complete search history.

(56) References Cited

U.S. PATENT DOCUMENTS

| | | | | |
|---|---|---|---|---|
| 4,124,182 A * | 11/1978 | Loeb ....................... 244/153 R |
| 4,166,596 A * | 9/1979 | Mouton et al. ................ 244/30 |
| 4,335,093 A | 6/1982 | Salomon |
| 6,072,245 A * | 6/2000 | Ockels ......................... 290/55 |
| 6,254,034 B1 * | 7/2001 | Carpenter ............... 244/153 R |
| 6,523,781 B2 * | 2/2003 | Ragner ................... 244/153 R |
| 6,555,931 B2 * | 4/2003 | Mizzi .......................... 290/54 |
| 6,616,402 B2 * | 9/2003 | Selsam ........................ 415/3.1 |
| 7,104,504 B2 | 9/2006 | Peterson et al. |
| 7,109,598 B2 * | 9/2006 | Roberts et al. ................. 290/44 |
| 7,188,808 B1 * | 3/2007 | Olson ..................... 244/153 R |
| 7,210,896 B2 | 5/2007 | Knott |
| 7,317,261 B2 * | 1/2008 | Rolt ............................. 290/55 |
| 2002/0040948 A1 | 4/2002 | Ragner |
| 2006/0065787 A1 | 3/2006 | Peterson et al. |

FOREIGN PATENT DOCUMENTS

| | | |
|---|---|---|
| DE | 656 194 | 1/1938 |
| DE | 24 37 003 | 2/1976 |
| DE | 31 00 085 A1 | 12/1982 |
| DE | 32 09 368 A1 | 9/1983 |
| DE | 32 24 976 A1 | 1/1984 |

(Continued)

*Primary Examiner*—Nicholas Ponomarenko
(74) *Attorney, Agent, or Firm*—Leydig, Voit & Mayer, Ltd.

(57) ABSTRACT

The present invention provides a device for converting wind flow energy into mechanical energy, comprising a wind-engaging member having an aerodynamic profile which generates an uplift force in the direction of a load cable when the airflow direction is perpendicular to the load cable, a steering mechanism configured to produce a steered movement about a first axis or in a first direction of the wind-engaging member and about a second axis or in a second direction that is different from the first direction or axis of the wind-engaging member, relative to the airflow direction, and a control unit configured to use the steering mechanism to move the wind-engaging member along a predetermined flight path in a flight plane perpendicular to the load cable. The present invention further provides a method for converting wind flow energy into mechanical energy and a docking station for use with the device.

33 Claims, 4 Drawing Sheets

FOREIGN PATENT DOCUMENTS

| | | |
|---|---|---|
| DE | 41 05 318 A1 | 8/1992 |
| DE | 43 19 823 A1 | 12/1994 |
| DE | 195 26 129 A1 | 1/1997 |
| DE | 199 61 035 A1 | 7/2001 |
| DE | 101 09 640 C1 | 6/2002 |
| EP | 0 391 601 A2 | 10/1990 |
| EP | 0 841 480 A1 | 5/1998 |
| FR | 2837166 A1 | 9/2003 |
| WO | WO 00/40860 A2 | 7/2000 |
| WO | WO 2004/104413 A1 | 12/2004 |
| WO | WO 2005/100147 A1 | 10/2005 |
| WO | WO 2005/100150 A1 | 10/2005 |
| WO | WO 2006/027194 A1 | 3/2006 |
| WO | WO 2006/027195 A1 | 3/2006 |
| WO | WO 2007/000788 A1 | 1/2007 |
| WO | WO 2007/034193 A2 | 3/2007 |

* cited by examiner

WIND ENERGY PLANT WITH A STEERABLE KITE

CROSS-REFERENCE TO RELATED APPLICATIONS

This patent application claims priority to German Patent Application No. 20 2006 005 389.1, filed Mar. 31, 2006, which is hereby incorporated by reference.

BACKGROUND OF THE INVENTION

The invention relates to a device for converting wind flow energy into mechanical energy, comprising a wind-engaging member connected to a base station by a load cable, a load cable storage means disposed at the base station, said storage means being configured to accommodate a section of the load cable, a control unit configured to veer out and haul in the load cable section cyclically from/into the load cable storage means, an energy converter configured to convert the energy from the wind flow force transferred from the wind-engaging member via the load cable, and the movement of the load cable section veered out from the load cable storage means into an electrical, thermodynamic or mechanical form of energy, a steering mechanism configured to produce a steered movement about a first axis or in a first direction of the wind-engaging member relative to the direction of airflow, a control unit configured to use the steering mechanism to bring the wind-engaging member, after the load cable section has been veered out, into a flight position associated with a low tensile force, and to bring the wind-engaging member, after the load cable section has been hauled in, into a flight position associated with a high tensile force.

Such a device is known from WO 00/40860. The basic principle of this notorious device is to allow a parachute to climb from a low position to a higher position while keeping the parachute horizontally offset above its anchoring point on the ground so that a high tensile force is produced in the guy cable of the parachute. This tensile force is used to drive a winch which serves as an attachment point for the parachute, with generators being driven by the rotation of said winch. After a certain length of the guy cable has been veered out, the parachute is steered into a position approximately vertical above the attachment point on the ground and/or the winch, thus minimizing the tensile force in the guy cable. The guy cable is then hauled in again by the veered-out length, then the parachute is steered into a horizontally offset position above the attachment point on the ground and the cycle starts anew. The difference between the energy generated by the generator when the rope is veered out and the energy that must be expended in order to haul in the rope results in the wind flow energy being converted into an electrical energy at the output of the generator.

This principle has a number of disadvantages which render its practical implementation difficult and which make it difficult to achieve an economical degree of efficiency.

A first disadvantage is that cyclical switching of the system between the generation and consumption of electrical energy occurs due to the cyclical manner of operation. On the one hand, this can cause variations which render it impossible to feed any electrical energy generated into public or private grids, for example. Another disadvantage of this cyclical switching is that the system routinely and repeatedly transitions from commencement of veering-out to a constant veering-out operation. Due to inertia of the system as a whole, the start-up operation can extend over a broad range of rope lengths, as a result of which various operating points are passed though in each cycle. Different cycles will also differ in respect of the veering speed, depending on which operating status the system is in when veering-out begins. Owing to these factors, it is impossible to adjust the generator in an economical manner to the convertible energy from the wind-engaging member. As a result, the efficiency of the system is reduced and the production costs of the system are increased.

Another disadvantage of the system is that economical operation is only possible when the length of guy cable veered out is large. However, this means large rope weights, which reduce the efficiency of the system. The large veered-out section of load cable also generates heavy wear of the guy cable, which results in overall deterioration in the efficiency of the system.

BRIEF SUMMARY OF THE INVENTION

In accordance with preferred embodiments, the present invention reduces at least one of the problems of the notorious device and provides an improved device in terms of both economy and energy efficiency.

In one aspect, the present invention provides a wind-engaging member comprising an aerodynamic profile which generates an uplift force in the direction of the load cable when the airflow direction is perpendicular to the load cable, the steering mechanism being configured to generate a steered movement of the wind-engaging member, relative to the direction of airflow, in a second direction or about a second axis that is different from said first direction or axis, and by the control unit being configured to move the wind-engaging member along a predetermined flight path in a flight plane perpendicular to the load cable.

The invention is based on the realization that many problems in the notorious device can be avoided by embodying the wind-engaging member as an aerodynamic profile which generates uplift in a transverse airflow and which is moved along predetermined flight paths in the plane perpendicular to the guy cable. According to the invention, the steering mechanism is configured in such a way that, in addition to the previously known system for steering the wind-engaging member into the vertical position above the attachment point on the ground at the end of the veering-out operation, it is also possible to steer the wind-engaging member in a second, different direction in the plane perpendicular to the guy cable, as a result of which the device according to the invention allows figures of different shape and size to be flown when the guy cable with the wind-engaging element is being veered out. By this means, the device according to the invention makes it possible, for example, for predetermined flight paths to be flown according to a fixed, prescribed program when the guy cable is being veered out, or for predetermined flight paths based on an automatic control loop to be flown during the veering-out procedure. In this way, the tensile force of the load cable can be increased, on the one hand, and the amount of tensile force in the load cable to be regulated and/or controlled to a desired value at any time during the veering-out procedure in order to achieve optimized veering-out and optimized operation of the energy converter.

The steering mechanism according to the invention can consist, for example, of a plurality of control cables running between the wind-engaging member and the base station, and provided with appropriate hauling-in and veering-out mechanisms for said control cables. In particular, the steering mechanism can also comprise a control platform disposed between the guy cable and the wind-engaging member and at a constant distance thereto, and which is connected by a plurality of load and control cables to the wind-engaging member and is disposed in the corresponding hauling-in and veering-out devices for said load and control cables. This development of the invention has the advantage that the wind-engaging member is connected by a single cable to the base station and that the control cables extend only over a short distance between the control platform and the wind-engaging member.

The control unit of the device according to the invention preferably includes an electronic data processing device that actuates the veering-out and hauling-in devices accordingly, by means of an automatic control loop or by means of pre-programmed sets of data for specific figures to be flown and their respective timing, in order to haul in and veer out the control cables and/or the load and control cables so that the figures are executed.

In a first advantageous embodiment, the control unit and the steering mechanism are configured to move the wind-engaging member, when the load cable is being veered out, in the flight plane perpendicular to the load cable along a circular or oval flight path or along a flight path having the shape of a horizontal figure-of-eight.

It has been found that these figures can be accomplished by means of a reliable control device of simple construction, on the one hand, and that an optimal tensile force can be achieved by flying these figures. In particular, it can be advantageous to alternate between two figures once or more times during veering-out in order to take account of the prevailing winds at different altitudes, the veering speed and the speed of the wind-engaging member, accordingly. The figures themselves can also be modified quantitatively, in addition to the qualitative changes described in the foregoing, i.e. they can be increased or decreased in their dimensions when the load cable is being veered out.

One particularly preferred embodiment of the invention consists in the control unit and the steering mechanism being configured to move the wind-engaging member in the flight plane perpendicular to the towing cable along several successive, cyclically repeating and closed flight paths when the towing cable is being veered out.

In this development of the invention, the wind-engaging member is preferably moved during veering-out of the load cable in such flight paths that it permanently generates a large tensile force that can be used to generate energy. In such a case, the wind-engaging member does not move when veering along a flight path in the lateral and upper peripheries of the wind window that can be used to produce a high tensile force in the load cable, but preferably moves in the area in the middle of said wind window and provides as large a horizontal offset between the wind-engaging member and base station as possible without reaching too low a flight altitude. In this embodiment of the device, a problem that routinely occurs is that the wind-engaging member must be accelerated at the beginning of the veering procedure, thus resulting in additional inertia of members to be moved and accelerated, with the wind-engaging member being moved at a constant speed when this acceleration procedure has been completed, and having to be braked in speed again at the end of the veering procedure. The steering mechanism and control unit according to the invention now allow the wind-engaging member to move along flight paths that are optimal for each of these three flight conditions, in order to achieve operating states throughout the veering procedure that are optimal for converting the energy from the tensile force and from the movement of the load cable. For example, a particularly large tensile force can be set during the accelerating procedure in order to keep the non-stationary phase brief, and then to reduce the tensile force after the acceleration phase has been completed, in order to enable for a long period of time a tensile force and veering movement that is adapted exactly to the design rating of the energy converter and to reduce the tensile force at the end of the veering procedure in order to keep at a low level the loads acting on the entire device as a result of the wind-engaging member being braked in speed.

This is particularly advantageous when the device according to the invention is developed by including a sensor for measuring the tensile force, said sensor being connected to the control unit in order to communicate the measured tensile force to the control unit, and further characterized in that the control unit and the steering mechanism are configured to move the wind-engaging member in the flight plane perpendicular to the load cable, when the load cable is being veered out, in at least two successive flight paths in such a way that the tensile force remains approximately constant. The tensile force of the load cable is an important variable for the energy conversion process and also relevant for ensuring the operational reliability of the entire device even during strong winds. As already described, it is particularly advantageous to move the wind-engaging member along certain flight paths in order to systematically change the tensile force in the load cable or to deliberately keep the tensile force constant. During most of the veering procedure, after completion of the acceleration phase forces and before the braking phase begins, it is advantageous, in particular, to steer the wind-engaging member in such a way that the tensile force and veering speed of the load cable remain approximately constant. To this end, an automatic control loop with tensile force as input variable and with a steering command as output can act directly, or a matching flight path and/or flight path altitude can be selected from a previously stored table containing different figures or flight path dimensions, for example, depending on a measured tensile force or a measured change in the tensile force, with the steering measures for executing said flight path being selected accordingly.

A second particularly preferred embodiment of the device according to the invention is one in which the control unit and the steering mechanism are configured to move the wind-engaging member in the flight plane perpendicular to the load cable along a closed flight path, and to move the wind-engaging member along a flight path section associated with high tensile force when the load cable is being veered out, and to move the wind-engaging member along a flight path section associated with low tensile force when the load cable is being hauled. This development of the invention differs from those described above having a plurality of cyclically repeating and closed flight paths during the veering procedure in that the wind-engaging member moves along only one section of a single closed flight path during the veering procedure. This section during the veering procedure corresponds too the flight path section that generates the greatest tensile force on the flight path being flown. After going through this section associated with the greatest tensile force in the load cable, the wind-engaging member enters a flight path section associated with low tensile force and which is typically located at a lateral or upper periphery of the usable wind window. In this flight path section, the load cable is then hauled in by the length that it was previously veered. Of course, differences between the hauling and veering lengths can be stipulated, for example to fly the flight paths at a higher or lower altitude and to make the wind-engaging member climb or drop for this purpose. This development of the invention is particularly suitable for working with only short veering lengths or hauling lengths, and in such cases to achieve a greater alternation frequency between the veering and hauling phases than is the case with those developments of the invention involving a plurality of flight paths during the veering procedure. This is advantageous with regard to the developments described below for converting the cyclically generated energy into a constant form of energy. The length of cable section that is veered out is also reduced, thus leading to a simplified construction of the entire device and to a reduction of wear and tear on the load cable. One important difference in this development of the invention compared to the developments described in the foregoing and involving a plurality of flight paths during the veering procedure is that, in this particular development of the invention, the wind-engaging member is preferably steered during each flight path at least once into an area associated with especially low tensile force in the load cable, so that the load cable can be hauled in under conditions in which the tensile force in the load cable is as small as possible. This means, in contrast to the embodiments described previously, that this embodiment is not aimed at flying the wind-engaging member such that it has a large tensile force at every point along the flight path, but only during the specific flight path section that is used for veering out the load cable, whereas in a subsequent flight path section the load cable is hauled in under as small a tensile force as possible.

The embodiment can be further improved if the control unit and the steering mechanism are configured to move the wind-engaging member in the flight plane perpendicular to the load cable along a circle or along a horizontal or perpendicular oval shape, said control unit being configured to haul in the load cable when the wind-engaging member is located in one or either of the horizontally lateral flight path sections, or during the upper flight path section, and to veer out the load cable during the flight path sections connecting said flight path sections. For this embodiment, an oval or circular flight path provides a particularly favorable relationship between those flight path sections in which the load cable is veered out and hence energy is extracted from the force of wind flow, and those flight path sections in which the load cable is hauled in. The aim of an optimized flight path is to pass through the flight path sections as fast as possible as with as little energy expenditure as possible when the load cable is being hauled in, and hence to haul in the entire length of load cable that was previously veered out, whereas those flight path sections during which the cable is veered out are passed through as long as possible and under the greatest possible tensile force in the load cable.

As an alternative to the embodiment just described, it is also advantageous when the control unit and the steering mechanism are configured to move the wind-engaging member in the flight plane perpendicular to the load cable along a horizontal or perpendicular figure-of-eight, said control unit being configured to haul in the load cable during the horizontally lateral flight path sections, or during the upper flight path section, and to veer out the load cable during the intersecting flight path sections connecting said flight path sections. This flight path form has the advantage that it is located, when the point of intersection is approximately in the ideal wind position, along a long stretch of the flight path near this ideal wind position. In addition, no twisting of the load cable is produced when the flight path is the horizontal or upright figure-of-eight, so there is no need for any rotary decoupling mechanism that would otherwise be necessary, for example in the form of a rotary bearing.

It is particularly preferred when the control unit and the steering mechanism are configured to move the wind-engaging member in the direction of gravitational force during the horizontally lateral flight path sections. As described in the foregoing, the wind-engaging member is steered in this embodiment at least within a lateral and/or upper region at the periphery of the usable wind window in order to minimize the tensile force in the load cable. The flight attitude at this periphery is generally less stable than in the rest of the wind window, with the consequence that the ability to steer the wind-engaging member can be restricted, particularly when the wind strength or wind direction is subject to variation. This restriction can preferably be compensated by the wind-engaging member moving in the direction of gravitational force in these less stable peripheral areas, the case of a horizontal figure-of-eight flight path, thus obtaining inherent stability due to the force of gravity. In this manner, it is possible to maintain a flight speed of the wind-engaging member even when the ability to steer it is temporarily restricted, and hence to retain a sufficient degree of steering control that can be used to return the wind-engaging member toward the middle of the usable wind window.

The device according to the invention, in particular the two particularly advantageous embodiments described in the foregoing, can be further developed in the form of a device for converting into constant energy the cyclical energy produced by the energy converter, the device being one or more of the following: a flywheel, a pressure reservoir, a hoisting device for temporary storage of energy in a hoisted mass, at least one capacitor and/or at least one battery. In many applications, the energy provided by the device according to the invention and which is characterized by cyclical variation, on the one hand, due the cyclical alternation between veering out and hauling in the load cable, and on the other hand by variations in the tensile force or veering speed of the load cable, will not be suitable for feeding it directly into a local or public power grid, or suitable in some other way for being passed on or consumed in this varying form. For this reason, an important development of the device according to the invention is to convert the cyclical energy supply to a constant energy supply by various means. The different means for making the energy constant must be appropriately selected according to the specific application, form of energy and investment volume.

It is also preferred to develop the device according to the invention in the form of a device for storing the energy produced by the energy converter. This development enables the device according to the invention to be operated even where there is no connection to an energy network, and to temporarily store the energy converted from the force of wind flow and later to release the energy from the storage device when it is full, for example by means of a transport device or by moving the entire device of the invention along with its storage device to a place where the energy can be fed into a public or private energy network. It is thus possible to operate the device according to the invention on a floating platform, such as a ship, which after a certain operating duration will moor at such a place for feeding in the energy, and transfer the energy stored.

It is also preferred that the energy converter includes a pneumatic or hydraulic cylinder which is actuated by the tensile force and movement of the load cable and whose cylinder chamber is used to generate a fluid pressure and a flow of fluid. This development enables the energy converter to be of simple and robust design. The development is particularly suitable for the embodiment of the inventive device in which the wind-engaging member is moved along a closed flight path in a plane perpendicular to the load cable and the load cable is alternatingly veered out and hauled in depending on whether it is flying through a flight path section associated with a high tensile force or with a low tensile force.

It is particularly preferred when the energy converter is an electrical generator whose shaft is driven by the load cable via a pulley. This embodiment is robust, on the one hand, and enables the wind flow energy to be converted, on the other hand, into a form of electrical energy that can be used for many purposes.

The device can preferably be developed in the form of a device for converting the energy generated by the generator into chemical energy, in particular a device for producing a synthetic gas from the carbon dioxide in air, a device for producing distilled water from seawater, or a device for producing synthetic oil from natural gas or biomass.

These embodiments are particularly suitable for meeting local needs for a specific form of energy or for generating from the electrical energy a form of energy that is particularly easy to store.

It is also advantageous when the energy converter is configured to produce hydrogen.

By means of this development of the invention, a form of energy is provided which can be used for many different kinds of purpose and which can also be stored.

It is particularly advantageous to develop the device according to the invention by providing a compressor connected to a reservoir, said compressor being driven by the load cable and connected to the energy converter in such a manner that the hydrogen generated by the compressor is compressed and stored in such compressed form in the reservoir. By means of this development, the compression required to store the hydrogen gas produced is provided directly in the form of the mechanical energy obtained from the tensile force and movement of the load cable, thus avoiding any losses of efficiency and thus improving the overall efficiency of the inventive device on balance, talking the conversion and storage of the energy into account.

It is also preferred when the load cable storage means includes a mechanism for winding in the load cable, as well as a guide pulley that is fixed to a platform which can be moved relative to the ground and to which the energy converter is connected in order to transfer the tensile force and movement of the load cable. In this way, the wind-engaging member can be launched and landed by operating the mechanism for winding the load cable, and the device according to the invention can be continuously operated with the winding mechanism at a standstill, with the transfer of the force and movement of the load cable essential for energy conversion being effected by moving the platform and by pulling on the deflection device fixed to the platform. The platform can be guided in a cyclical, oscillating back-and-forth movement or can move continuously along a closed path, for example a circular path or an oval path or a figure-of-eight path. In particular, the path described by the moving platform can be adapted to the movement of the wind-engaging member, or to the tensile force curve.

It is particularly preferred in this regard when the platform rolls along a rail track fixed to the ground, said platform preferably being curved, and closed, in particular.

Another particularly preferred embodiment of the device according to the invention is characterized by at least one additional, second load cable provided with a respective second wind-engaging member, said wind-engaging member having an aerodynamic profile which generates an uplift force in the direction of the load cable when the airflow direction is perpendicular to said profile, comprising a steering mechanism configured to produce a steered movement of said second wind-engaging member relative to the direction of airflow, in a first direction or about a first axis, and in a second, different direction, or about a second axis different from the first axis, wherein the control unit is configured to move the second wind-engaging member along a predetermined flight path in a plane perpendicular to the load cable, in such a way that the second load cable is veered out and hauled in with a phase shift relative to the first load cable.

Using a second wind-engaging member allows the energy output of the inventive device to be kept constant, by veering out and hauling in the two wind-engaging members with a phase shift relative to each other, such that energy can be generated at any time from either one of the two wind-engaging members. The two wind-engaging members can be moved along different flight paths or can be moved one behind the other along identical flight paths. This development can also be developed such that a plurality of wind-engaging members are provided which are moved in a phase-shifted manner relative to each other along predetermined flight paths, in such a manner than that a substantially constant form of energy is obtained over time by superimposing the obtained from the tensile forces in the load cables and from the movements of the wind-engaging members.

It is preferred to operate the device according to the invention by applying a method for converting wind flow energy into mechanical energy and comprising the steps cyclically veering out and hauling in a wind-engaging member connected by means of a load cable to a load cable storage means, converting the energy from the wind flow force transferred from the wind-engaging member via the load cable, and the movement of the load cable section veered out from the load cable storage means into an electrical, thermodynamic or mechanical form of energy steering the wind-engaging member, after veering out the cable section, into a flight position associated with a low tensile force, and steering the wind-engaging member, after hauling in the cable section, into a flight position associated with a high tensile force, characterized in that the wind-engaging member is steered about a second axis or direction that is different from the first axis or direction and that the wind-engaging member is moved along a predetermined flight path in a flight plane perpendicular to the load cable.

With regard to details, advantages and examples of the separate steps, reference is made to those aspects of the respective device according to the invention, described in the foregoing, which are suitable for executing the method.

It is preferred in this context that, when the load cable is being veered out, the wind-engaging member moves in the flight plane perpendicular to the load cable along a circular or oval flight path, or along a flight path having the shape of a horizontal or upright figure-of-eight.

It is further preferred that, when the load cable is being veered out, the wind-engaging member moves along several successive, cyclically repetitive and closed flight paths in the flight plane perpendicular to the load cable It is also preferred that the tensile force is measured, the measured tensile force is transmitted to the control unit, and that, when the load cable is being veered out, the wind-engaging member is steered in the flight plane perpendicular to the load cable along at least two successive flight paths in such a way that the tensile force remains approximately constant.

It is preferred, in addition, that the wind-engaging member moves in the flight plane perpendicular to the load cable along a closed flight path and is steered, when the load cable is being veered out, along a flight path associated with a high tensile force, and is steered, when the load cable is being hauled in, along a flight path associated with a low tensile force.

It is also preferred when the wind-engaging member is steered in the flight plane perpendicular to the load cable along a circle or along a horizontal or vertical oval, and the load cable is hauled in when the wind-engaging member is located in the horizontally lateral flight path section, or during the upper flight path section, and is veered out during the flight path sections connecting said flight path sections.

It is also preferred that the wind-engaging member is steered in the flight plane perpendicular to the load cable along a horizontal or vertical figure-of-eight, and the load cable is hauled in when the wind-engaging member is located in the horizontally lateral flight path sections, or during the upper flight path section, and is veered out during the intersecting flight path sections connecting said flight path sections.

It is further preferred that the wind-engaging member is steered in the direction of gravitational force during the horizontally lateral flight path sections.

It is also preferred when the cyclical energy produced by the energy converter is converted into constant energy.

It is also preferred that the energy produced by the energy converter is stored.

It is also preferred when hydrogen is produced using the energy of the moved wind-engaging member.

It is also preferred that the hydrogen is compressed by means of the compressor driven by the load cable and stored in compressed form in a reservoir.

The device and the method according to the invention are particularly suitable for use on a ship or waterborne platform. The energy required locally on the ship or platform can be supplied by the device and method, or the ship or platform can be operated in the form of an offshore wind energy plant, and the converted energy continuously fed into an energy network, or stored for later transport and for later feeding into such a network.

It is particularly preferred for the device according to the invention when the ship or waterborne platform is connected during energy generation to a stationary docking station via which the energy generated is fed into a stationary energy network. This avoids having to store the energy on board the ship, while at the same time enabling the device and method to be installed and operated on a ship, and hence to be moved in mobile form to regions with especially high energy yields in which a matching docking station is available.

BRIEF DESCRIPTION OF THE SEVERAL VIEWS OF THE DRAWING(S)

Some possible embodiments of the invention shall now be described with reference to the attached drawings, in which.

DETAILED DESCRIPTION OF THE INVENTION

Figure 1:
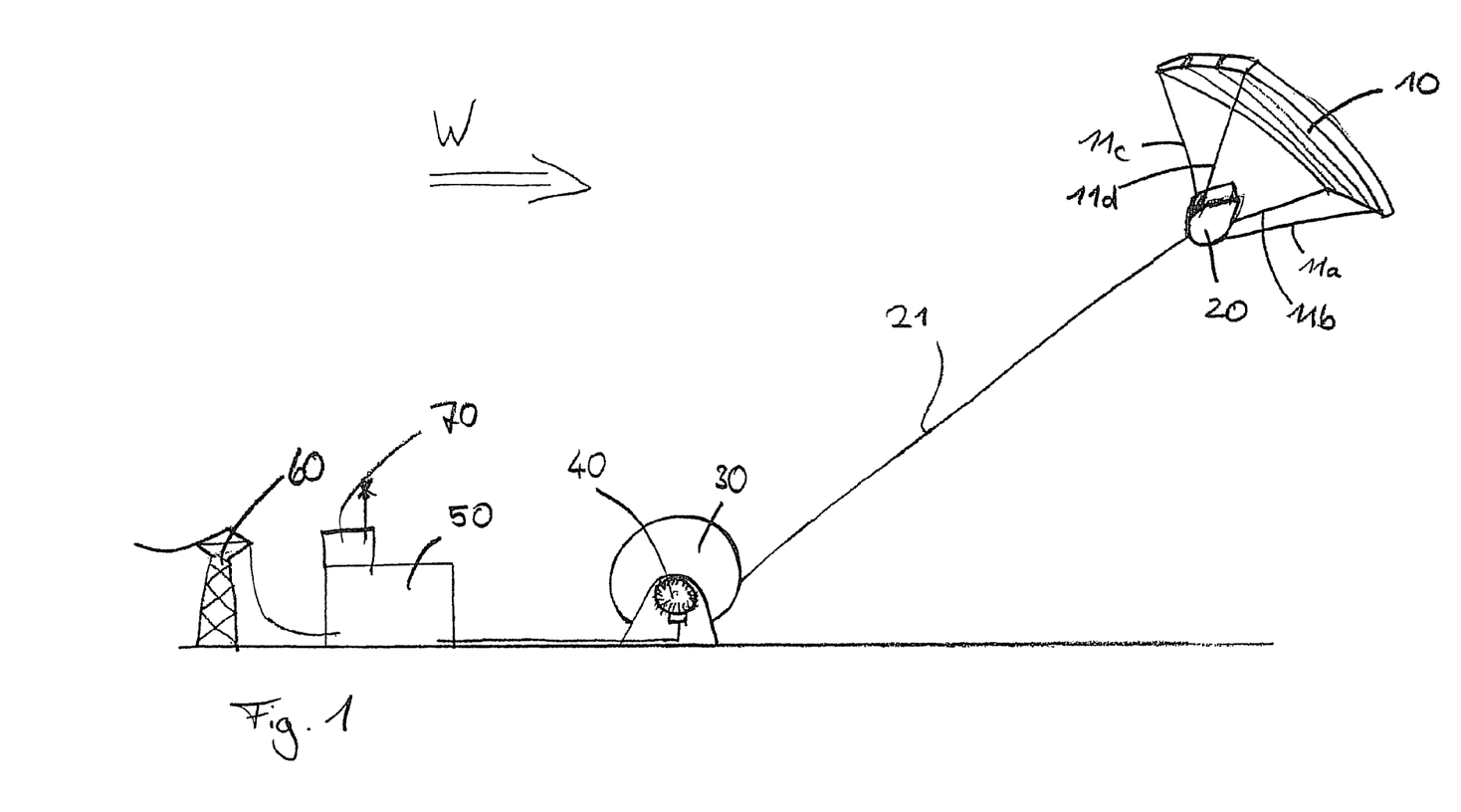
FIG. 1: shows a perspective view, from the side, of a first embodiment of the device according to the invention.

FIG. 1 shows a steerable kite 10 which is fixed to a steering mechanism 20 by a plurality of control cables 11a-d. Steering mechanism 20 is connected by means of a load cable 21 to a winch 30 anchored to the ground.

A prime mover 40 which can be toggled between a generator and a motor function is connected to cable winch 30. The generator/motor 40 is connected to a device 50 for smoothing the generated energy and/or for intermediate storage of the generated energy, and which is connected to a public network 60 for feeding the energy obtained into said network.

Figure 2:
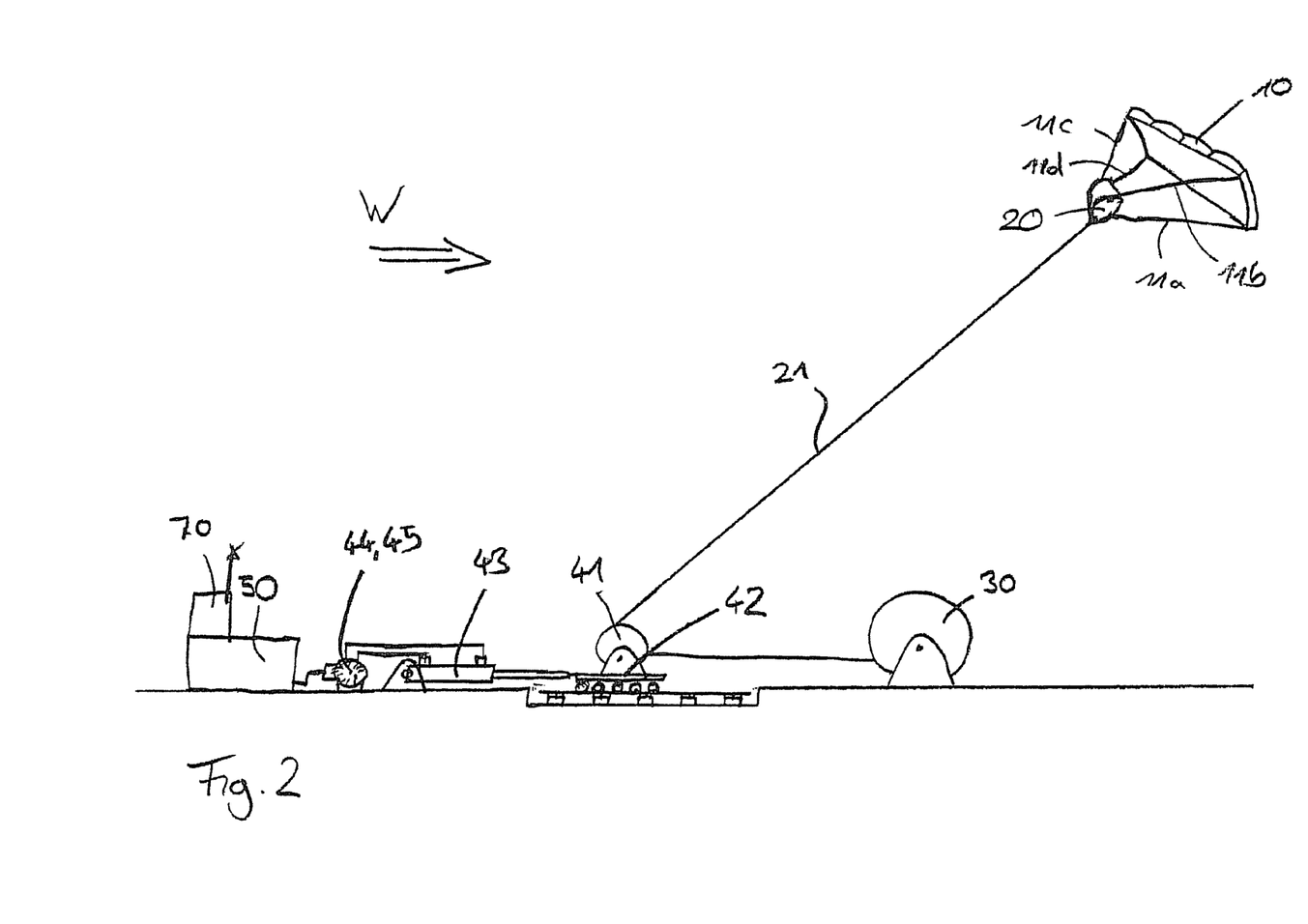
FIG. 2: shows a perspective view, from the side, of a second embodiment of the device according to the invention.

FIG. 2 shows a second embodiment of the device according to the invention. Here again, a steerable kite 10 is coupled by means of control cables 11a-d to a steering mechanism 20 which is connected for its part to a ground station by a load cable 21. The load cable 21 coming from kite 10 is deflected via a guide pulley 41 into a horizontal attitude and led to a cable winch 30.

Guide pulley 41 is mounted on a horizontally and displaceably mounted bogie which can be moved oscillatingly back and forth between two end positions.

Bogie 42 is coupled to the cylindrical rod of a hydraulic cylinder 43, and when bogie 42 moves, the cylindrical rod of cylinder 43 is moved in an out.

The cylinder chambers of cylinder 43 are connected for their part to a hydraulic motor 44, which produces a rotational movement from movement of the pressurized fluid and to which a generator 45 is flanged that generates electric current from said rotational movement.

Generator 45 is coupled, in turn, to a device for smoothing the energy obtained and which is connected to the public network (not shown in FIG. 2).

In order to perform the hauling-in movement on bogie 42, the hydraulic motor 44 and generator 45 can be toggled between electric motor 45 and hydraulic pump 44, and the hydraulic cylinder can be actuated accordingly.

Both the embodiments in FIGS. 1 and 2 further comprise a central control device 70 or 170, which transmits control commands by wireless transmission to steering mechanism 20. Control unit 70 is connected to smoothing device 50 and receives information from the latter about the current energy production or energy consumption status of generator/motor 40 or 44 and 45. Depending on this information and additional data such as wind direction, wind force, kite position and attitude, control unit 70 causes steering mechanism 70 to execute changes in the direction flown by steerable kite 10, described in greater detail below, so that the steerable kite 10 flies along specific flight paths.

Figure 3:
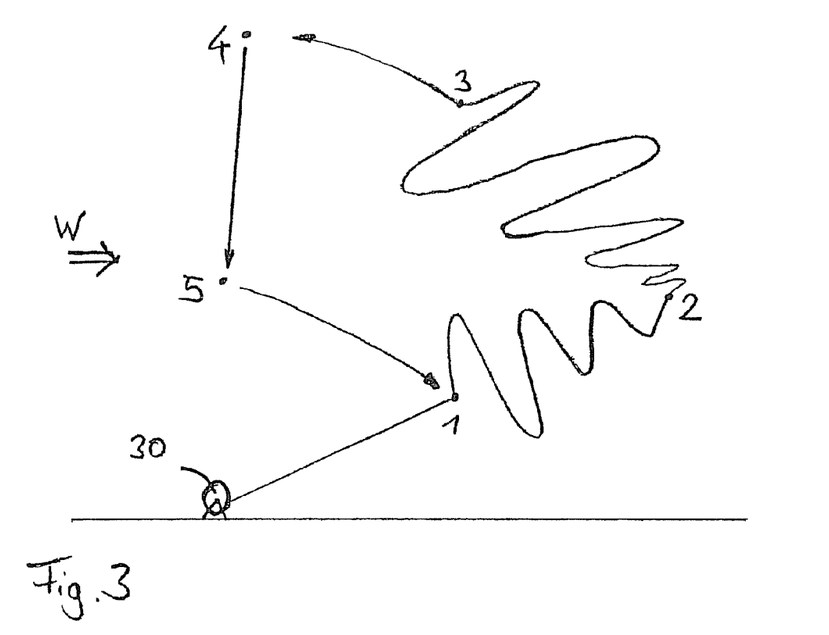
FIG. 3: shows a schematic diagram of the sequence of flight positions according to a first embodiment of the method according to the invention, in a view perpendicular to the wind direction.
Figure 4:
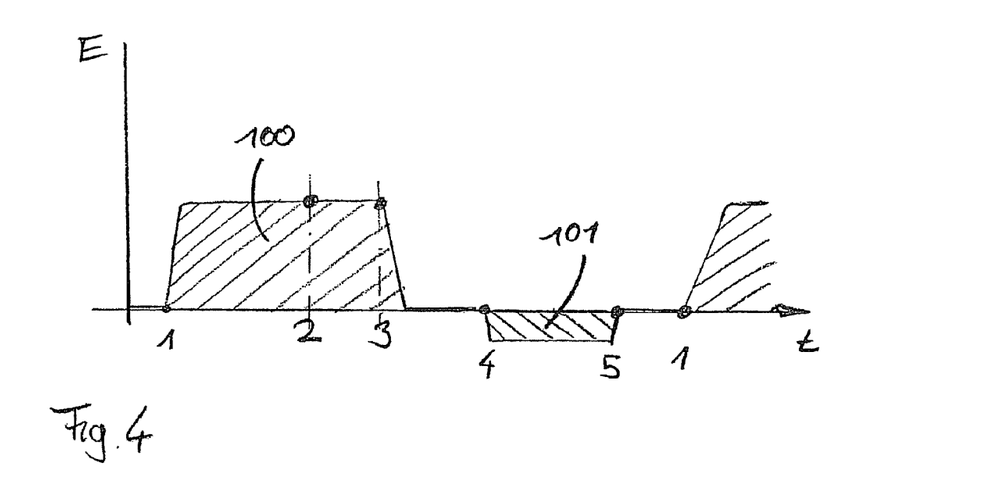
FIG. 4: shows a plot of energy against time for a flight path sequence as in FIG. 3.
Figure 5:
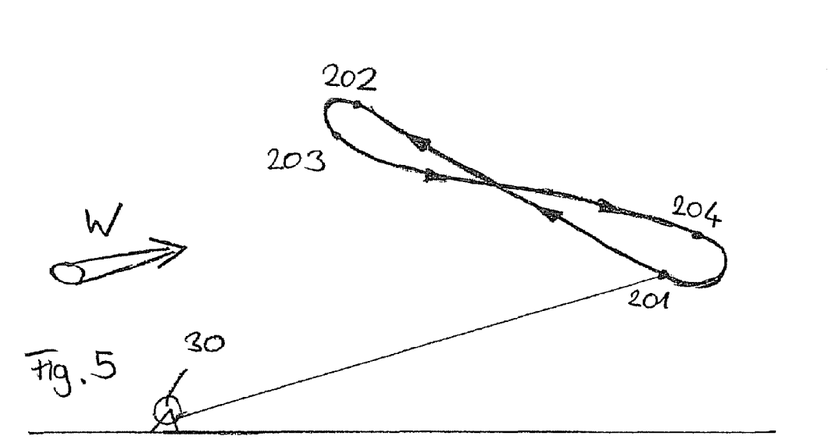
FIG. 5: shows a schematic view of a flight path sequence for a second embodiment of the method according to the invention, in a perspective view approximately perpendicular to the wind direction.

FIGS. 3-5 show a first sequence of the energy generation method according to the invention: After a general start, the cycle begins at position 1 of the flight path. Proceeding from this position 1, load cable 21 is veered out and the steerable kite 10 is moved by means of the steering mechanism 20, and superimposed upon said veering movement, along a flight path perpendicular to the plane of the tensile cable, which may be arc-shaped or in the form of a figures-of-eight. The amplitude of the arcs and their horizontal or vertical alignment is selected according to the wind direction in such a way that a constant amount of energy can be generated with the aid of the generator from the tensile force and tensile cable movement produced by kite 10.

At a position 2, the veering speed of the load cable is reduced and the load cable is made to change direction by the steering mechanism into a direction that basically leads to a position vertically over the ground attachment point of the load cable. During this movement, the steerable kite 10 is steered along snake-shaped paths or figures-of-eight or the like, such that generation of additional constant energy is achieved. At a particular position 3 where the tensile force in the load cable is no longer sufficient to generate energy, the veering movement of the load cable is completely stopped, and the steerable kite is steered to the zenith approximately vertically above the ground attachment point.

When the zenith has been reached, in position 4, generator 40 is switched its motor function and the load cable is hauled in as far as position 5, with energy being expended in the process. Since the tensile force in this flight attitude of steerable kite 10 is less than in the flight attitude which is horizontally offset from the ground attachment point, the required to haul in the previously veered-out lengths of load cable is less than the energy extracted when veering out the load cable. The net amount of energy generated in each cycle of the method according to the invention is the difference between hatched area 100 and hatched area 101 in FIG. 4.

From position 5, steerable kite 10 is guided back in the horizontal direction as far as position 1 and the cycle begins anew.

Figure 6:
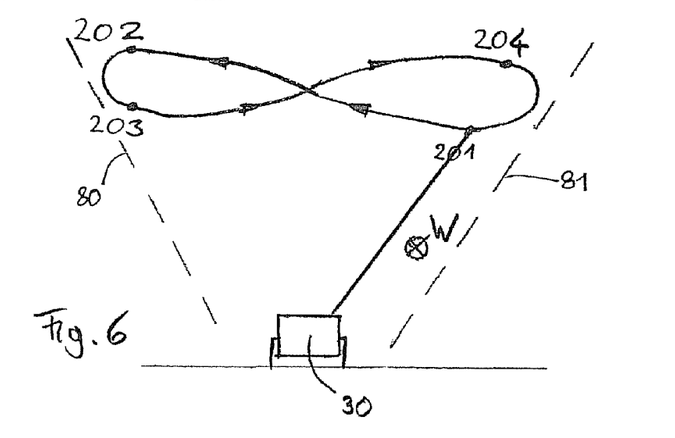
FIG. 6: shows the flight path as in FIG. 5, viewed in the direction of the wind.
Figure 7:
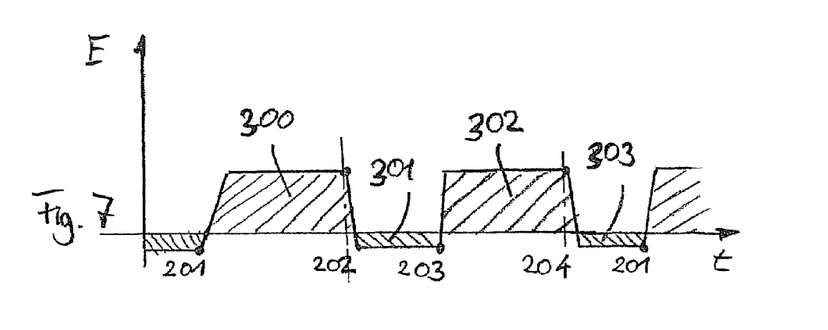
FIG. 7: shows as plot of energy against time for the flight path in FIGS. 5 and 6.

FIGS. 5-7 illustrate a second embodiment of the energy extraction method according to the invention. After the cable has been veered out in a start-up procedure, the cycle begins at a position 201 on a flight path which takes the form of a figure-of-eight in the example shown. The figure-of-eight flight path lies in a plane perpendicular to the load cable and at the same time approximately perpendicular to the wind direction, or on an approximately spherical surface defined by the load cable as its radius.

Proceeding from position 1, the steerable kite 10 is guided through the window of maximum tensile force to a position 202, with the load cable being veered out all the while. The flight path section between positions 201 and 202 is therefore used to generate the amount of energy 300 in FIG. 7.

At position 202, the steerable kite has reached the outermost periphery 80 of the usable wind window, and the tensile force in the load cable is at its minimum. The steerable kite is now guided in a vertical downward loop to a position 203, and a length of load cable is hauled in again thereby, with the generator switched to the motor function, that is equal to the length that was veered out between positions 201 and 202. Since the tensile force in the load cable is less than it was between positions 201 and 202, a smaller amount of energy 301 is consumed when hauling in the cable than was previously generated.

Proceeding from position 203, the steerable kite is guided once again through the section associated with the highest tensile force to a position 204, with the load cable being veered out all the while. The steerable kite crosses its previous flight path between positions 201 and 202. An amount of energy 302 is obtained that typically equals the amount of energy 302.

At position 204, the steerable kite has reached the opposite periphery 81 of the usable wind window, and the tensile force in the load cable is at its minimum again. The steerable kite is guided once again in a downward loop to reach the initial position 201. Between positions 204 and 201, the load cable is hauled in by the amount that it was veered out between positions 203 and 204. To haul in the load cable, an amount of energy 303 is required that is approximately equal to energy amount 301. The cycle now begins anew.

The net amount of energy generated in each cycle is calculated by adding energy amounts 300 and 302 and subtracting energy amounts 301 and 303.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A device for converting wind flow energy into mechanical energy, comprising
    a wind-engaging member connected to a base station by a load cable;
    a load cable storage means disposed at the base station, said storage means being configured to accommodate a section of the load cable;
    a control device configured to veer out and haul in the load cable section cyclically from and into the load cable storage means;
    an energy converter configured to convert the energy from the wind flow force transferred from the wind-engaging member via the load cable, and the energy from the movement of the load cable section veered out from the load cable storage means into an electrical, thermodynamic or mechanical form of energy;
    a steering mechanism configured to produce a steered movement about a first axis or in a first direction of the wind-engaging member relative to the airflow direction;
    a control unit configured to use the steering mechanism to:
    bring the wind-engaging member, after the load cable section has been veered out, into a flight position associated with a low tensile force; and to bring the wind-engaging member, after the section of load cable has been hauled in, into a flight position associated with a high tensile force;
    wherein,
    the wind-engaging member has an aerodynamic profile which generates an uplift force in the direction of the load cable when the airflow direction is perpendicular to the load cable;
    the steering mechanism is configured to generate a steered movement of the wind-engaging member, relative to the direction of airflow, in a second direction or about a second axis that is different from the said first direction or axis; and that
    the control unit is configured to move the wind-engaging member along a predetermined flight path in a flight plane perpendicular to the load cable.

2. A device according to claim 1, wherein the control unit and the steering mechanism are configured to move the wind-engaging member, when the load cable is being veered out, in the flight plane perpendicular to the load cable along a circular or oval flight path or on a flight path having the shape of a horizontal or upright figure-of-eight.

3. A device according to claim 1, wherein the control unit and the steering mechanism are configured to move the wind-engaging member in the flight plane perpendicular to the load cable along several successive, cyclically repeating and closed flight paths when the load cable is being veered out.

4. A device according to claim 3, further comprising a sensor for measuring the tensile force, said sensor being connected to the control unit in order to communicate the measured tensile force to the control unit, and wherein the control unit and the steering mechanism are configured to move the wind-engaging member in the flight plane perpendicular to the load cable, when the load cable is being veered out, along at least two successive flight paths in such a way that the tensile force remains approximately constant.

5. A device according to claim 1, wherein the control unit and the steering mechanism are configured to move the wind-engaging member along a closed flight path in the flight plane perpendicular to the load cable, and in order to move the wind-engaging member, when the load cable is being veered out, along a flight path section associated with a high tensile force, and, when the load cable is being hauled in, along a flight path section associated with a low tensile force.

6. A device according to claim 5, wherein the control unit and the steering mechanism are configured to move the wind-engaging member in the flight plane perpendicular to the load cable along a circle or along a horizontal or vertical oval shape, said control unit being configured to haul in the load cable when the wind-engaging member is located in one or either of the horizontally lateral flight path sections, or during the upper flight path section, and to veer out the load cable during the flight path sections connecting said flight path sections.

7. A device according to claim 5, wherein the control unit and the steering mechanism are configured to move the wind-engaging member in the flight plane perpendicular to the load cable along a horizontal or upright figure-of-eight, said control unit being configured to haul in the load cable during the horizontally lateral flight path sections, or during the upper flight path section, and to veer out the load cable during the intersecting flight path sections connecting said flight path sections.

8. A device according to claim 7, wherein the control unit and the steering mechanism are configured to move the wind-engaging member in the direction of gravitational force during the horizontally lateral flight path sections.

9. A device according to claim 1, further comprising a device for converting into constant energy the cyclical energy produced by the energy converter.

10. A device according to claim 1, further comprising a device for storing the energy produced by the energy converter.

11. A device according to claim 1, wherein the energy converter includes a pneumatic or hydraulic cylinder which is actuated by the tensile force and movement of the load cable and whose cylinder chamber is used to generate a fluid pressure and a flow of fluid.

12. A device according to claim 1, wherein the energy converter is an electrical generator whose shaft is driven by the load cable via a pulley.

13. A device according to claim 12, further comprising a device for converting into chemical energy the electrical energy generated by the generator.

14. A device according to claim 1, wherein the energy converter is configured to produce hydrogen.

15. A device according to claim 14, further comprising a compressor connected to a reservoir, said compressor being driven by the load cable and connected to the energy converter in such a manner that the hydrogen produced is compressed by the compressor and stored in such compressed form in the reservoir.

16. A device according to claim 1, wherein the load cable storage means includes a mechanism for winding in the load cable, as well as a guide pulley that is fixed to a platform which can be moved relative to the ground and to which the energy converter is connected in order to transfer the tensile force and movement of the load cable.

17. A device according to claim 16, wherein the platform rolls along a rail track.

18. A device according to claim 17, further comprising a second load cable provided with a second wind-engaging member:
said second wind-engaging member having an aerodynamic profile which generates an uplift force in the direction of the load cable when the airflow direction is perpendicular to said profile; and
comprises a steering mechanism configured to produce a steered movement of said second wind-engaging member relative to the direction of airflow, in a first direction or about a first axis, and in a second, different direction, or about a second axis different from the first axis, wherein the control unit is configured to move the second wind-engaging member along a predetermined flight path in a plane perpendicular to the load cable, in such a way that the second load cable is veered out and hauled in with a phase shift relative to the first load cable.

19. A method for converting wind flow energy into mechanical energy, comprising the steps:
cyclically veering out and hauling in a wind-engaging member connected by means of a load cable to a load cable storage means;
converting the energy from the wind flow force transferred from the wind-engaging member via the load cable, and the movement of the load cable section veered out from the load cable storage means into an electrical, thermodynamic or mechanical form of energy;
steering the wind-engaging member, after veering out the cable section, into a flight position associated with a low tensile force; and
steering the wind-engaging member, after hauling in the cable section, into a flight position associated with a high tensile force, wherein
the wind-engaging member is steered about a second axis or direction that is different from the first axis or direction and that the wind-engaging member is moved along a predetermined flight path in a flight plane perpendicular to the load cable.

20. A method according to claim 19, wherein the wind-engaging member moves, when the load cable is being veered out, in the flight plane perpendicular to the load cable along a circular or oval flight path, or along a flight path having the shape of a horizontal or upright figure-of-eight.

21. A method according to claim 20, wherein the wind-engaging member moves, when the load cable is being veered out, in several successive, cyclically repeating and closed flight paths in the flight plane perpendicular to the load cable.

22. A method according to claim 20, wherein the tensile force is measured, the measured tensile force is transmitted to the control unit, and the wind-engaging member is steered in the flight plane perpendicular to the load cable, when the load cable is being veered out, along at least two successive flight paths in such a way that the tensile force remains approximately constant.

23. A method according to claim 19, wherein the wind-engaging member moves in the flight plane perpendicular to the load cable along a closed flight path; and is steered, when the load cable is being veered out, along a flight path associated with a high tensile force; and is steered, when the load cable is being hauled in, along a flight path associated with a low tensile force.

24. A method according to claim 23, wherein the wind-engaging member is steered in the flight plane perpendicular to the load cable along a circle or along a horizontal or vertical oval, and the load cable is hauled in when the wind-engaging member is located in the horizontally lateral flight path section, or during the upper flight path section, and is veered out during the flight path sections connecting said flight path sections.

25. A method according to claim 23, wherein the wind-engaging member is steered in the flight plane perpendicular to the load cable along a horizontal or vertical figure-of-eight, and the load cable is hauled in when the wind-engaging member is located in the horizontally lateral flight path sections, or during the upper flight path section, and is veered out during the intersecting flight path sections connecting said flight path sections.

26. A method according to claim 25, wherein the wind-engaging member is steered in the direction of gravitational force when the wind-engaging member is located in the horizontally lateral flight path sections.

27. A method according to claim 19, wherein the cyclical energy produced by the energy converter is converted into constant energy.

28. A method according to claim 19, wherein the energy produced by the energy converter is stored.

29. A method according to claim 19, wherein hydrogen is produced using the energy of the moved wind-engaging member.

30. A method according to claim 29, wherein the hydrogen is compressed by means of the compressor driven by the load cable and is stored in compressed form in a reservoir.

31. A docking station for using a device for converting wind flow energy into mechanical energy on a ship or waterborne platform, comprising a means for maintaining a stationary position relative to the seabed, and further comprising an energy transfer connection for receiving energy obtained from the device, the device comprising:
a device for converting wind flow energy into mechanical energy, comprising
a wind-engaging member connected to a base station by a load cable;
a load cable storage means disposed at the base station, said storage means being configured to accommodate a section of the load cable;
a control device configured to veer out and haul in the load cable section cyclically from and into the load cable storage means;
an energy converter configured to convert the energy from the wind flow force transferred from the wind-engaging member via the load cable, and the energy from the movement of the load cable section veered out from the load cable storage means into an electrical, thermodynamic or mechanical form of energy;
a steering mechanism configured to produce a steered movement about a first axis or in a first direction of the wind-engaging member relative to the airflow direction;
a control unit configured to use the steering mechanism to:
bring the wind-engaging member, after the load cable section has been veered out, into a flight position associated with a low tensile force; and to
bring the wind-engaging member, after the section of load cable has been hauled in, into a flight position associated with a high tensile force;
wherein,
the wind-engaging member has an aerodynamic profile which generates an uplift force in the direction of the load cable when the airflow direction is perpendicular to the load cable;
the steering mechanism is configured to generate a steered movement of the wind-engaging member, relative to the direction of airflow, in a second direction or about a second axis that is different from the said first direction or axis; and that
the control unit is configured to move the wind-engaging member along a predetermined flight path in a flight plane perpendicular to the load cable.

32. A device according to claim 9, wherein the device for converting into constant energy is a flywheel, a pressure reservoir, a hoisting device for temporary storage of energy in a hoisted mast, at least one capacitor, at least one battery, or a combination thereof.

33. A device according to claim 13, wherein the device for converting electrical energy generated by the generator into chemical energy is selected from:
a device for producing a synthetic gas from the carbon dioxide in air;
a device for producing distilled water from seawater; and
a device for producing synthetic oil from natural gas or biomass.

* * * * *